(12) United States Patent
Yamamoto et al.

(10) Patent No.: US 9,004,804 B2
(45) Date of Patent: Apr. 14, 2015

(54) ATTACHMENT STRUCTURE AND ATTACHMENT UNIT

(75) Inventors: Hiroyuki Yamamoto, Guangdong (CN); Tomoaki Nagayama, Yokohama (JP)

(73) Assignee: NIFCO Inc., Yokohama-shi, Kanagawa (JP)

( * ) Notice: Subject to any disclaimer, the term of this patent is extended or adjusted under 35 U.S.C. 154(b) by 248 days.

(21) Appl. No.: 13/500,488

(22) PCT Filed: Oct. 12, 2010

(86) PCT No.: PCT/JP2010/067888
§ 371 (c)(1),
(2), (4) Date: May 18, 2012

(87) PCT Pub. No.: WO2011/046118
PCT Pub. Date: Apr. 21, 2011

(65) Prior Publication Data
US 2012/0230761 A1    Sep. 13, 2012

(30) Foreign Application Priority Data
Oct. 14, 2009    (JP) .................................. 2009-237203

(51) Int. Cl.
*F16B 21/00*    (2006.01)
*F16B 5/12*    (2006.01)

(52) U.S. Cl.
CPC ...................................... *F16B 5/126* (2013.01)

(58) Field of Classification Search
USPC ...................... 403/321, 325, 326, 329, 322.1; 293/154, 155
See application file for complete search history.

(56) References Cited

U.S. PATENT DOCUMENTS

| 4,593,441 A | * | 6/1986 | St. Louis | 24/297 |
| 5,577,779 A | * | 11/1996 | Dangel | 292/80 |
| 5,678,953 A | * | 10/1997 | Usui et al. | 403/329 |

(Continued)

FOREIGN PATENT DOCUMENTS

| CN | 201428671 Y | 3/2010 |
| DE | 202007003498 U1 | 5/2007 |

(Continued)

OTHER PUBLICATIONS

Machine Translation of DE202007003498, Espacenet, http://worldwide.espacenet.com, Translated Aug. 30, 2014.*

(Continued)

*Primary Examiner* — Michael P Ferguson
*Assistant Examiner* — Daniel Wiley
(74) *Attorney, Agent, or Firm* — Manabu Kanesaka

(57) ABSTRACT

An elastically deformable bridging piece includes an engaging protruding part between two ends of the piece, insertion of a portion of an attaching member in a direction intersecting a longitudinal direction of the bridging piece is permitted by elastically deforming the bridging piece by contacting with the engaging protruding part with the portion, and the engaging protruding part engages an engaging hole formed in the portion at an insertion terminating position by elastically returning the bridging piece. A restricting part restricting elastic deformation of the bridging piece is provided. When inserting the portion, the restricting part inclines the bridging piece to position the engaging protruding part on the obliquely downward side, and when a force in a reverse direction to the inserting direction acts on the portion located at the insertion terminating position, the restricting part restricts inclination of the bridging piece, which is reversely-oriented to the former inclination.

14 Claims, 8 Drawing Sheets

(56) References Cited

U.S. PATENT DOCUMENTS

| | | | |
|---|---|---|---|
| 7,144,181 B2 * | 12/2006 | Areh et al. | 403/109.3 |
| 7,360,964 B2 * | 4/2008 | Tsuya et al. | 403/280 |
| 7,404,688 B2 * | 7/2008 | Schwab | 403/329 |
| 7,753,423 B2 * | 7/2010 | Zellner, Jr. | 296/1.08 |
| 7,793,998 B2 * | 9/2010 | Matsui et al. | 293/154 |
| 8,118,337 B2 * | 2/2012 | Nakayama | 293/115 |
| 2005/0054229 A1 | 3/2005 | Tsuya et al. | |
| 2007/0096482 A1 * | 5/2007 | Matsui et al. | 293/154 |

FOREIGN PATENT DOCUMENTS

| | | |
|---|---|---|
| FR | 2732731 A1 | 10/1996 |
| JP | H04-46954 | 4/1992 |
| JP | 2001-173615 A | 6/2001 |
| JP | 2003-049812 A | 2/2003 |
| JP | 2005-098496 A | 4/2005 |
| JP | 2006-234035 A | 9/2006 |

OTHER PUBLICATIONS

Chinese Patent Office, "Office Action for CN 201080046537.1", May 29, 2013.

Europe Patent Office, "European Search Report for EP 10823386.7," May 12, 2014.

* cited by examiner

ATTACHMENT STRUCTURE AND ATTACHMENT UNIT

RELATED APPLICATIONS

The present application is National Phase of International Application No. PCT/JP2010/067888 filed on Oct. 12, 2010, and claims priority from Japanese Application No. 2009-237203, filed on Oct. 14, 2009.

TECHNICAL FIELD

The present invention relates to a structure provided in an attached member, the structure being configured to combine the attached member with an attaching member so that a portion of the attaching member is inserted into a predetermined place of the attached member, thereby assembling both the members so that they cannot be easily separated from each other by one action, and an attachment tool attached to the attached member to cause the attached member to have the attachment structure.

BACKGROUND ART

There is proposed a coupling structure in which one of two coupled components has a frame part, the other has two pieces and an upper surface of one of the two pieces has an engaging angled part (refer to Patent Document 1). The frame part enters between the two pieces. One of the two pieces engages an edge of one of two components located at a protruding bottom of the frame part with the engaging angled part. In such coupling structure, when a force in separating direction is applied to the two coupled components, a high resisting force (pulling force) can be ensured. However, as the pulling force becomes higher, a resisting force (inserting force) is higher.

PRIOR ART DOCUMENTS

Patent Documents

Patent Document 1: Unexamined Japanese Patent Publication No. 2001-173615 (FIG. 3, FIG. 4)

SUMMARY OF THE INVENTION

Problems to be Solved by the Invention

A main problem to be solved by this invention is to ensure a high pulling force while reducing the inserting force in this type of attachment structure and an attachment tool (attachment unit) that causes the attachment structure to have the attached member.

Solutions to the Problems

To solve the problem, according to a first aspect of the present invention, an attachment structure includes an elastically deformable bridging piece having an engaging protruding part between both ends of the piece, the attachment structure being configured to insert a portion of an attaching member in a direction intersecting a longitudinal direction of the bridging piece by elastically deforming the bridging piece, which is caused by contacting with the engaging protruding part with the portion, and to engage the engaging protruding part with an engaging hole formed in the portion at an insertion terminating position due to elastic return of the bridging piece. The attachment structure further includes a restricting part restricting elastic deformation of the bridging piece. When inserting the portion, the restricting part inclines the bridging piece to position the engaging protruding part toward the obliquely downward side, and when a force in a reverse direction to the direction at insertion acts on the portion located at the insertion terminating position, the restricting part restricts inclination of the bridging piece, which is reversely-oriented to the former inclination.

Most suitably, the engaging protruding part has an apex located closer to an inserted side of the portion than a midpoint in a width direction of the bridging piece, and a restricting part restricting elastic deformation of the bridging piece is provided closer to the inserted side of the portion than the apex of the engaging protruding part. When inserting the portion, the restricting part inclines the bridging piece to position the engaging protruding part at the obliquely downward side, and when a force in a reverse direction to the direction at insertion acts on the portion located at the insertion terminating position, the restricting part restricts inclination of the bridging piece, which is reversely-oriented to the former inclination.

When inserting the portion of the attaching member, the restricting part inclines the bridging piece to position the engaging protruding part toward the obliquely downward side. Thereby, when inserting the portion of the attaching member toward the insertion terminating position, the resisting force, that is, the so-called inserting force is reduced. On the other hand, when the force in the reverse direction to the inserting direction acts on the portion of the attaching member located at the insertion terminating position, the restricting part restricts the downward inclination of the bridging piece toward the inserting side. Thereby, the resisting force against movement of the piece part from the insertion terminating position to the pre-insertion position, that is, the so-called pulling force is increased.

Most suitably, the restricting part is configured as a support part formed below the bridging piece or a contact part formed in the bridging piece contacting with a support surface formed below the bridging piece.

In order to solve the problem, according to a second aspect of the present invention, an attachment tool includes the bridging piece and the restricting part, and is attached to the attached member for use. The attachment tool is attached to the attached member to form a receiving gap in a portion of the attaching member between the attached member and the bridging piece.

Alternatively or in addition, an attachment tool includes the bridging piece and the restricting part, and is attached to the attached member for use. The attachment tool further includes a wall part forming a receiving gap in a portion of the attaching member between the wall part and the bridging piece.

Effects of the Invention

According to the present invention, the restricting part that restricts elastic deformation of the bridging piece can reduce the resisting force (inserting force) when inserting a portion of the attaching member and also ensure a high resisting force (pulling force) when a force in the reverse direction to the inserting direction acts, with a simple configuration.

EMBODIMENTS OF THE INVENTION

Figure 1:
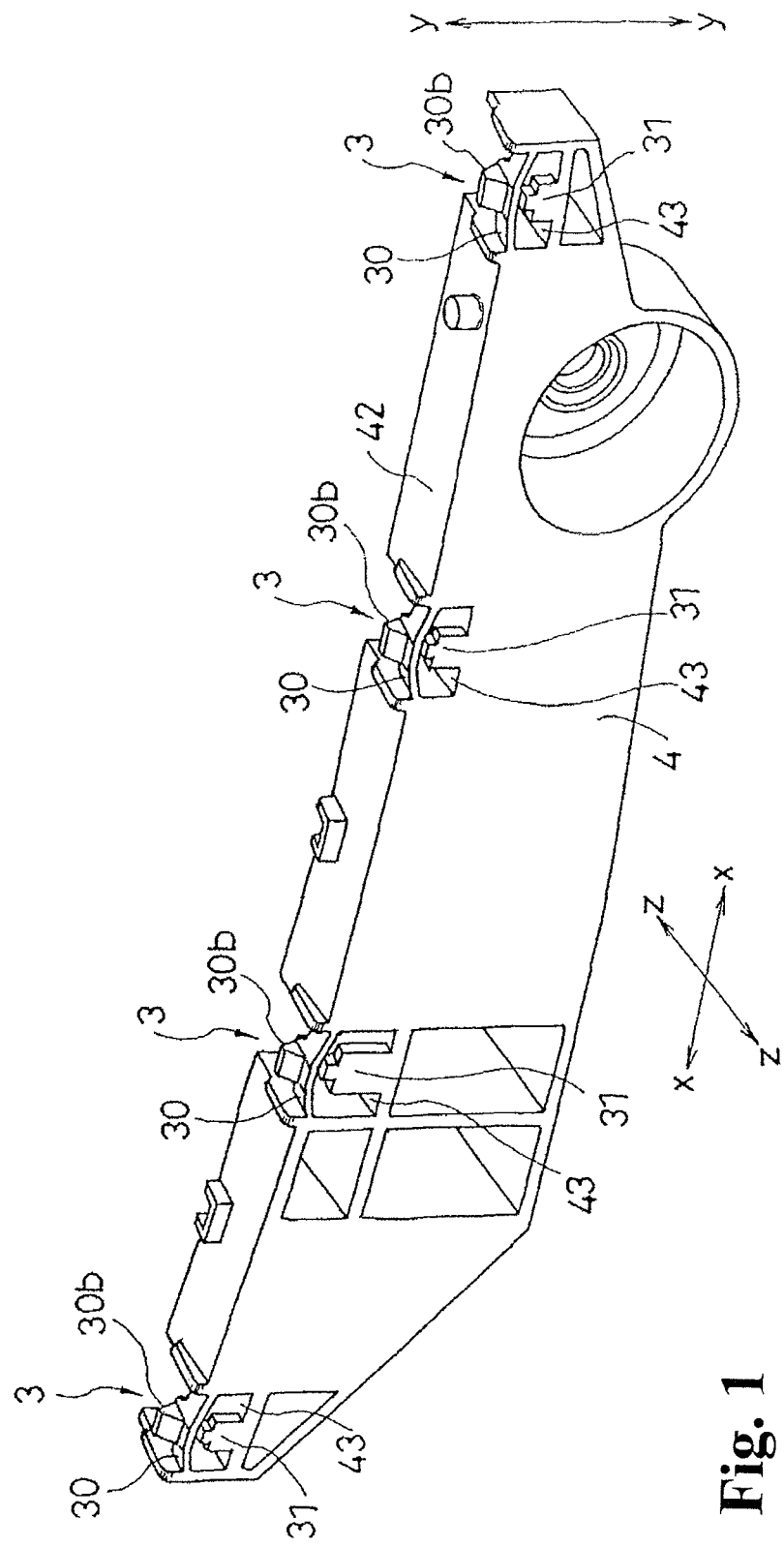
FIG. 1 is a perspective view of an attachment tool in accordance with an embodiment of the present invention.

A typical embodiment of the present invention will be described with reference to FIG. 1 to FIG. 12. An attachment structure 3 in accordance with this embodiment is a structure provided in an attached member 1. In such structure, by combining the attached member 1 with an attaching member 2 so that a portion of the attaching member 2 is inserted into a predetermined place of the attached member 1, both the members 1 and 2 are assembled so that they cannot be easily separated from each other by one action. An attachment tool 4 in accordance with this embodiment is attached to the attached member 1, thereby causing the attached member 1 to have the attachment structure 3.

Figure 2:
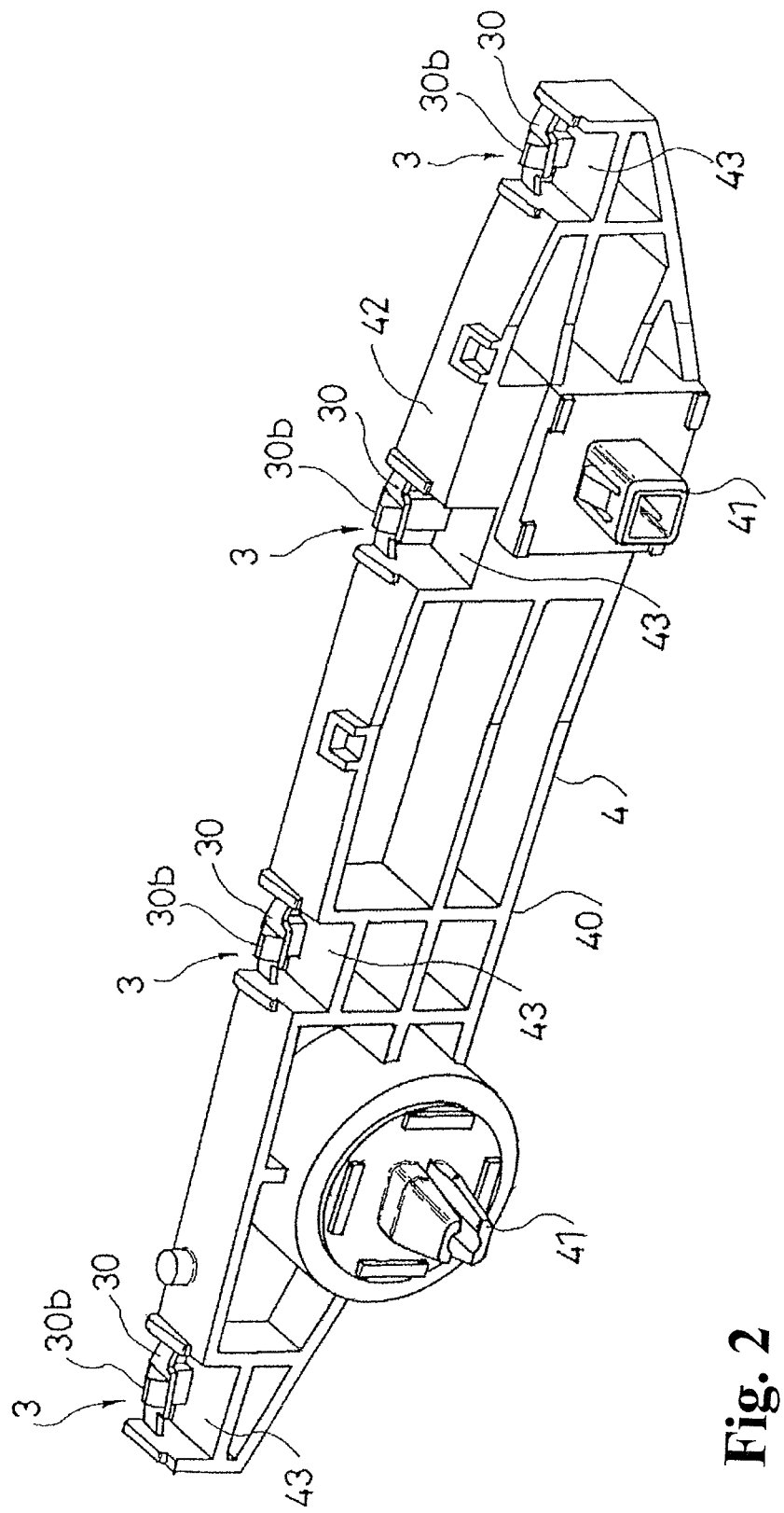
FIG. 2 is a perspective view showing the attachment tool of FIG. 1 from the opposite side.
Figure 3:
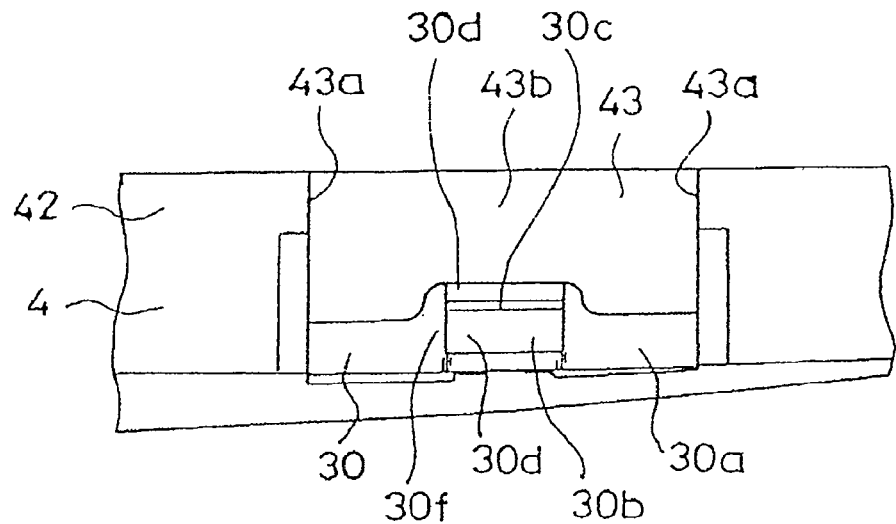
FIG. 3 is a plan view of a main part of an attachment structure constituting a part of the attachment tool shown in FIG. 1 and FIG. 2.
Figure 4:
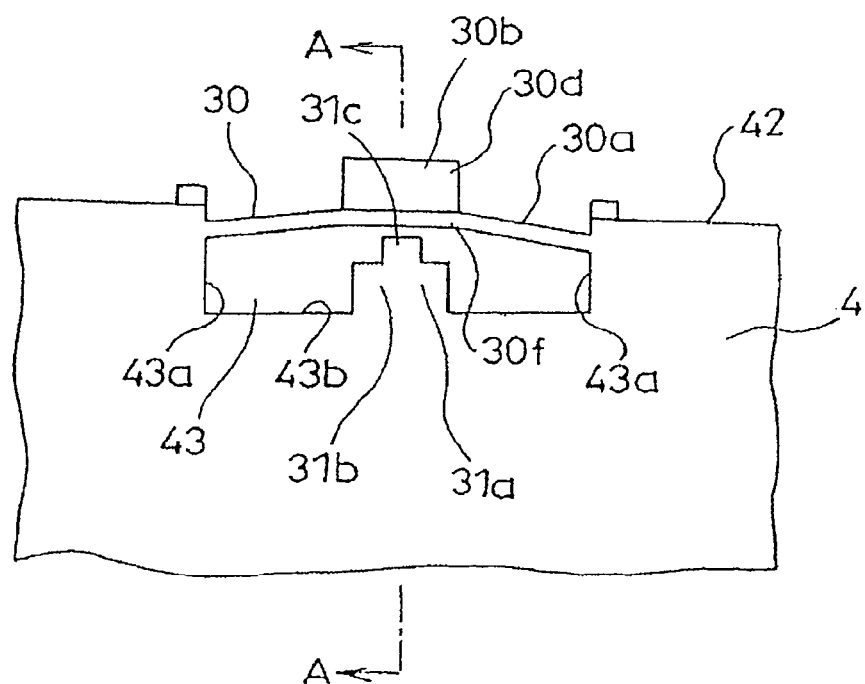
FIG. 4 is a front view of the main part of the attachment structure shown in FIG. 3.

FIG. 1 and FIG. 2 show one example of the attachment tool 4. In this example, the attachment tool 4 is formed of a plate-like body that is oblong in a lateral direction x and has a width in a vertical direction y and a thickness in a front-back direction z. An attachment leg 41 to be attached to the attached member 1 is protrudingly provided at each of two right and left positions on a rear surface 40 of the attachment tool 4. In this example, by fitting the attachment legs 41 into holes not shown provided in the attached member 1, the attachment tool 4 can be fixed to the attached member 1 using the attachment legs 41. Bridging pieces 30 constituting the attachment structure 3 are formed at four positions spaced in the lateral direction x in an upper surface 42 of the attachment tool 4. Each of the bridging pieces 30 is formed to be indented downward from the upper surface 42 of the attachment tool 4, and is provided in a wide divided groove 43 extending in the front-back direction z of the attachment tool 4. Each bridging piece 30 is provided in the divided groove 43 so that its longitudinal direction matches the longitudinal direction of the attachment tool 4, that is, the lateral direction x. One end of the bridging piece 30 is integrally connected to one side wall 43a of the divided groove 43 and the other end of the bridging piece 30 is integrally connected to the other side wall 43a of the divided groove 43. An engaging protruding part 30b is formed at a midpoint in the longitudinal direction on an upper surface 30a of the bridging piece 30. A restricting part 31 protrudes upward from a position on a groove bottom 43b of the divided groove 43, which is located immediately below a midpoint in the longitudinal direction of the bridging pieces 30. In the illustrated example, the attachment tool 4 is suitable for attaching a vehicle body panel as the attached member 1 thereto and attaching a bumper as the attaching member 2 to the body panel.

Figure 7:
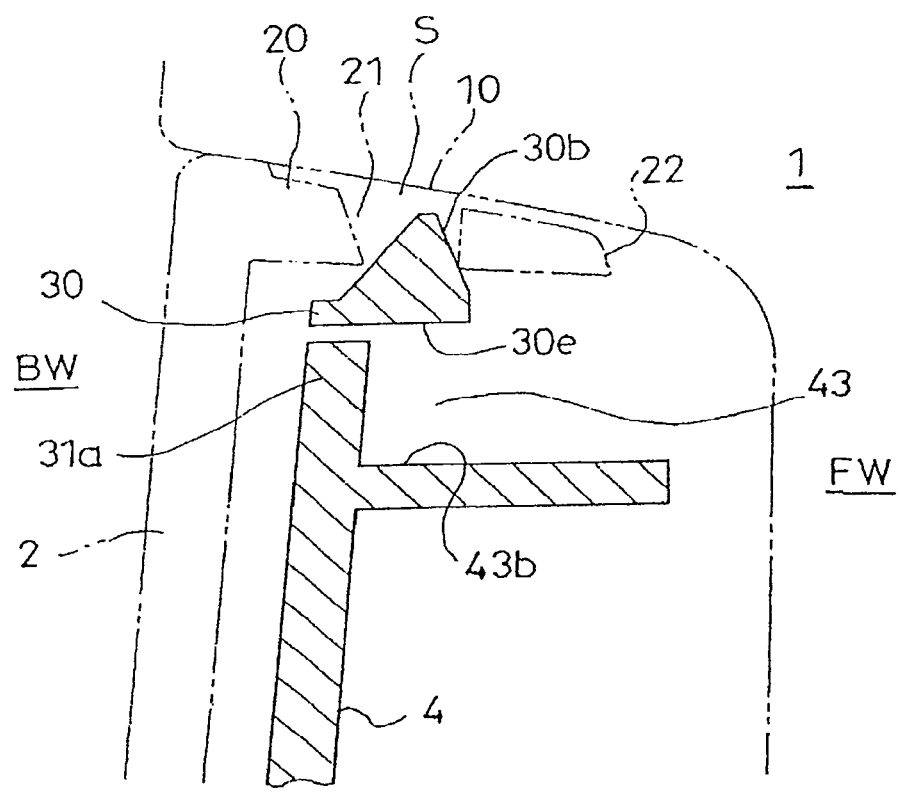
FIG. 7 is a cross-sectional view taken along a line A-A in FIG. 4 showing a state when the portion of the attaching member is located at the insertion terminating position.

In an example shown in FIG. 7, the attachment tool 4 is configured to be attached to the attached member 1 so as to form a receiving gap S for receiving a portion of the attaching member 2 between the attached member 1 and the bridging piece 30. That is, in the example shown in FIG. 7, the attached member 1 has a downward-facing horizontal stepped surface 10 that forms the receiving gap S between the attached member 1 and the upper surface 42 of the attachment tool 4 attached as described above. The attaching member 2 includes a plate-like piece part 20 that protrudes rearward from its rear surface, and the piece part 20 has an engaging hole 21 that vertically penetrate the piece part 20. In the example shown in FIG. 7, when the piece part 20 as a portion of the attaching member 2 is inserted into the receiving gap S from the front, that is, from the left in FIG. 7, elastic deformation of the bridging piece 30 due to contact of the engaging protruding part 30b with the piece part 20 allows the insertion, and at an insertion terminating position, the engaging protruding part 30b is engaged with the engaging hole 21 formed in the piece part 20 by elastic return of the bridging piece 30. In this manner, in the example shown in FIG. 7, the attaching member 2 and the attached member 1 can be assembled so that they cannot be easily separated from each other by one action through the attachment tool 4.

Figure 8:
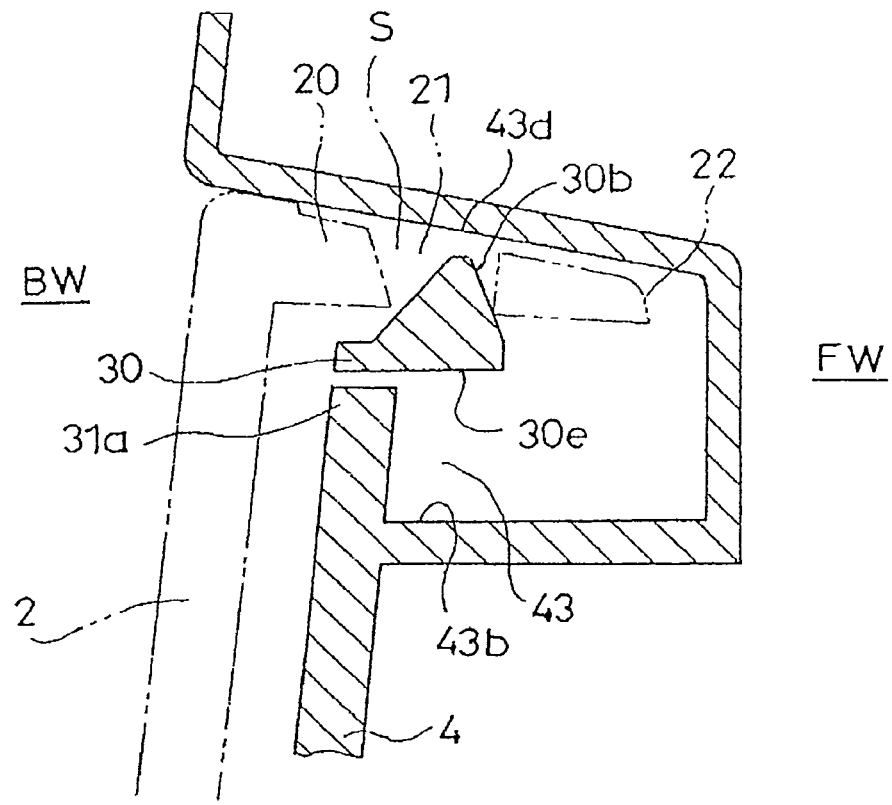
FIG. 8 is a cross-sectional view showing a partially modified example of the attachment tool shown in FIG. 1 to FIG. 7.

In an example shown in FIG. 8, the attachment tool 4 includes a wall part 43d that forms the receiving gap S for a portion of the attaching member 2 between the wall part 43d and the bridging piece 30.

That is, in the example shown in FIG. 8, the attachment tool 4 itself includes the downward-facing horizontal stepped surface, that is, the wall part 43d that forms the receiving gap S between the wall part 43d and the upper surface 42. In the example shown in FIG. 8, when the piece part 20 as a portion of the attaching member 2 is inserted into the receiving gap S from the front, that is, from the left in FIG. 8, elastic deformation of the bridging piece 30 due to contact of the engaging protruding part 30b with the piece part 20 allows the insertion. At an insertion terminating position, the engaging protruding part 30b is engaged with the engaging hole 21 formed in the piece part 20 by elastic return of the bridging piece 30. In this manner, as in the example shown in FIG. 8, the attaching member 2 and the attached member 1 can be assembled so that they cannot be easily separated from each other by one action through the attachment tool 4.

The attachment structure 3 in accordance with this embodiment has the restricting part 31 restricting elastic deformation of the bridging piece 30. When inserting a portion of the attaching member 2, that is, the piece part 20, the restricting part 31 inclines the bridging piece 30 to position the engaging protruding part 30b at an obliquely downward side. When a force in the reverse direction to the direction at insertion acts on the above-mentioned portion at the insertion terminating position, the restricting part 31 restricts inclination of the bridging piece 30, which is reversely-oriented to the above-mentioned inclination.

Specifically, in this embodiment, each bridging piece 30 is shaped like a band plate having a length and a width. The bridging piece 30 extends across both the side walls 43a, 43a of the divided groove 43 so that its lower surface faces the groove bottom 43b of the divided groove 43. A central part 30f that is substantially parallel to the groove bottom 43b of the divided groove 43 is located at a midpoint of the bridging piece 30 in the longitudinal direction. A region between the central part 30f and one end in the bridging piece 30 and a region between the central part 30f and the other end in the bridging piece 30 are slightly inclined so that an interval between the central part 30f and the groove bottom. 43b becomes larger as it gets closer to the central part 30f. The central part 30f of the bridging piece 30 is formed slightly wider than other regions, and the engaging protruding part 30b is formed on an upper surface of the central part 30f. An apex 30c of the engaging protruding part 30b is located closer to an inserted side Fw of the piece part 20 as a portion of the attaching member 2, that is, the rear side, than the midpoint in the width direction of the bridging piece 30. The engaging protruding part 30b is formed over the substantially whole length of the central part 30f of the bridging pieces 30. In the state where the bridging pieces 30 is cut along in the width direction at the position where the engaging protruding part 30b is formed, both a side surface 30d facing an inserting side Bw and a side surface 30d facing the inserted side Fw are inclined toward the apex 30c so as to gradually narrowing the engaging protruding part 30b. Inclination of the side surface 30d facing the inserting side Bw is moderate than inclination of the side surface 30d facing the inserted side Fw. In the illustrated example, the apex 30c of the engaging protruding part 30b is located above a lower surface facing the upper surface 42 of the attachment tool 4, of both surfaces along an insertion center line of the piece part 20. At this insertion, an end 22 of the piece part 20 hits against the side surface 30d facing the inserting side Bw in the engaging protruding part 30b. When the end 22 hits against the side surface 30d facing the inserting side Bw in the engaging protruding part 30b, the bridging piece 30 is elastically deformed so as to move the central part 30f downward due to inclination of the side surface 30d, allowing this insertion. When the piece part 20 of the attaching member 2 reaches the insertion terminating position, the engaging protruding part 30b can enter into the engaging hole 21. Thereby, the bridging piece 30 elastically returns at the insertion terminating position and enters into the engaging hole 21 of the piece part 20 and engages therewith.

Figure 9:
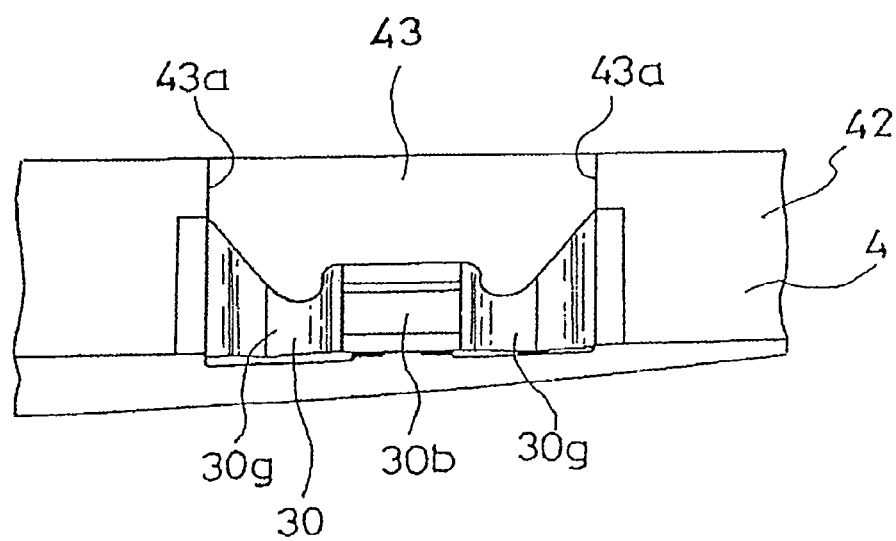
FIG. 9 is a plan view showing the partially modified example of the attachment tool shown in FIG. 1 to FIG. 7.
Figure 10:
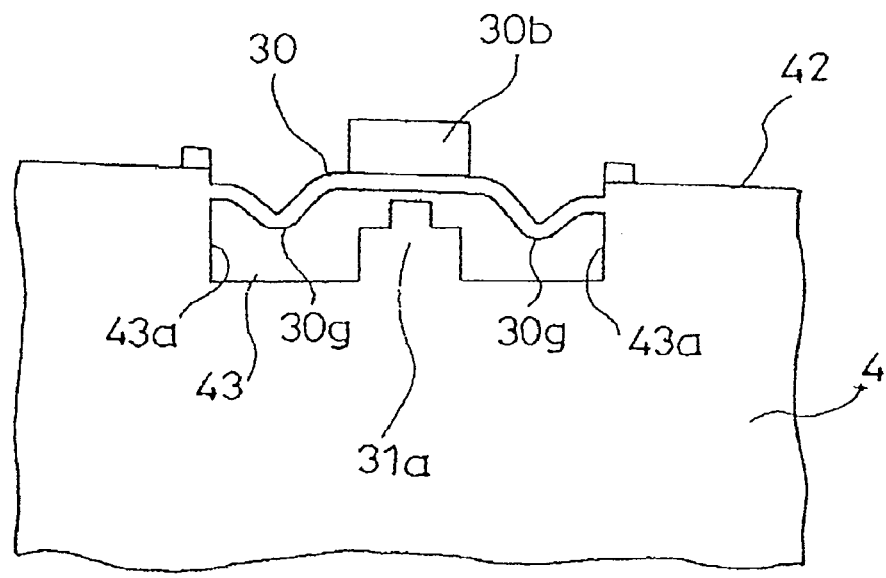
FIG. 10 is a front view showing the partially modified example in FIG. 9.

The bridging piece 30, as shown in FIG. 9 and FIG. 10, may have bending parts 30g bent toward the groove bottom 43b of the divided groove 43 between one end and the central part 30f of the bridging pieces 30 and between the other end and the central part 30f.

The restricting part 31 is located closer to a portion of the attaching member 2 than the apex 30c of the engaging protruding part 30b, that is, on the inserting side Bw of the piece part 20.

Figure 5:
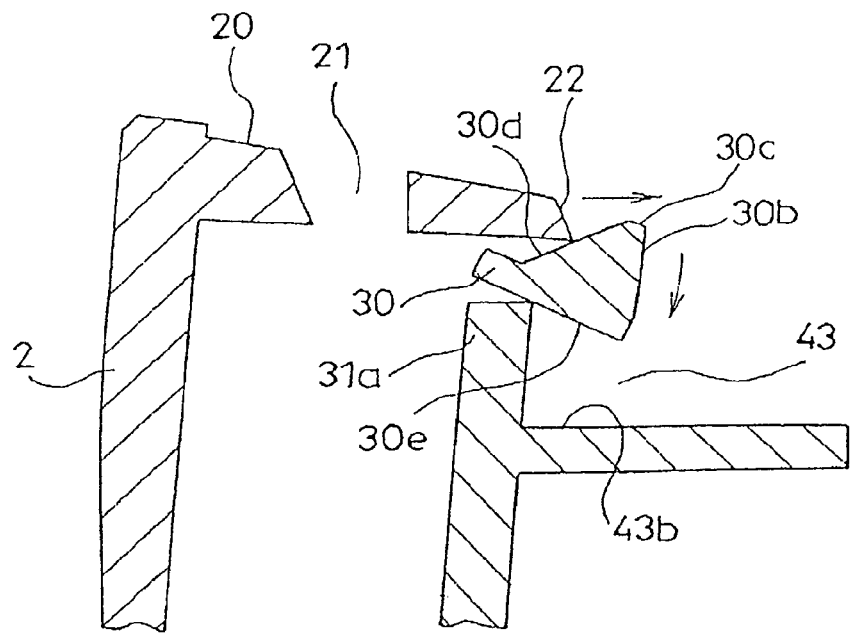
FIG. 5 is a cross-sectional view showing a state when a portion of an attaching member is inserted.
Figure 6:
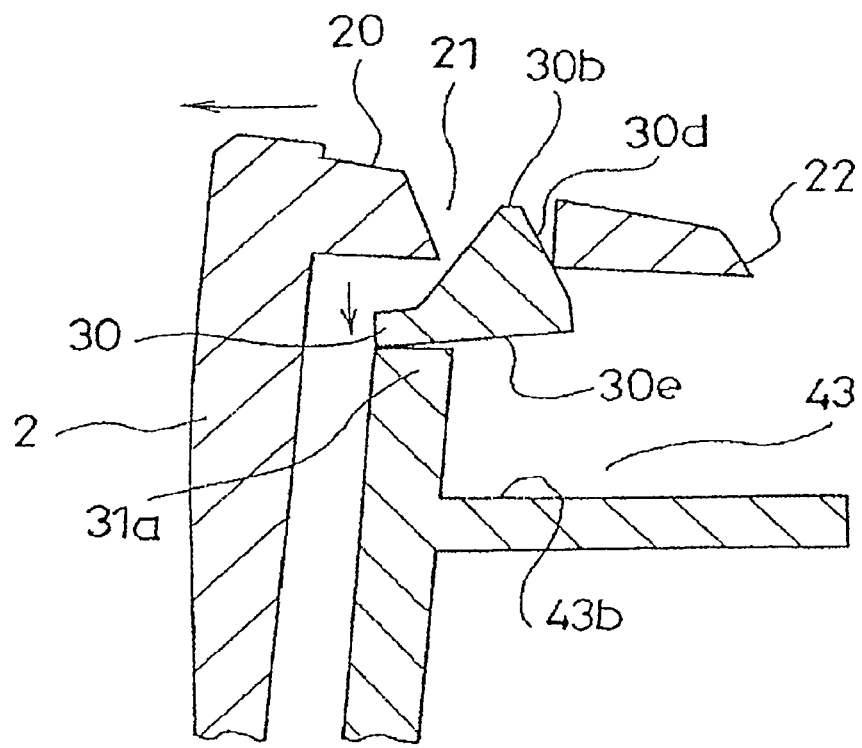
FIG. 6 is a cross-sectional view showing a state at the time when a force in the reverse direction of the direction at insertion acts on the portion of the attaching member.

In an example shown in FIG. 1 to FIG. 10, the restricting part 31 constitutes a support part 31a formed below the bridging piece 30. That is, in the example shown in FIG. 1 to FIG. 10, as described above, the restricting part 31 protrudes toward the groove bottom 43b of the divided groove 43. In the example shown in the figures, the support part 31a is configured of a bottom part 31b and a front end part 31c. The front end part 31c is formed integrally with the bottom part 31b so as to protrude upward from at a midpoint in the lateral direction x on an upper end surface of the bottom part 31b. A gap is formed between an upper end surface of the front end part 31c and a lower surface of the central part 30f of the bridging piece 30. In the example shown in FIG. 1 to FIG. 10, when inserting a portion of the attaching member 2, that is, the piece part 20, the support part 31a inclines the bridging piece 30 to position the engaging protruding part 30b at an obliquely downward side. When a force in the reverse direction to the inserting direction acts on the portion of the attaching member 2, that is, the piece part 20 located at the insertion terminating position, the support part 31a restricts inclination of the bridging piece 30, which is reversely-oriented to the above-mentioned inclination. Specifically, when inserting the piece part 20, the front end part 31c of the support part 31a contacts a place of the central part 30f of the bridging pieces 30 elastically deformed as described above on the inserting side Bw, and using the contact place as a fulcrum, the bridging piece 30 is inclined so that the engaging protruding part 30b is located at the obliquely downward side. Thereby, when inserting the piece part 20 toward the insertion terminating position, the resisting force, that is, the so-called inserting force is reduced (FIG. 5). On the other hand, when the force in the reverse direction to the inserting direction acts on the portion of the attaching member 2, that is, the piece part 20 located at the insertion terminating position, the hole edge portion of the engaging hole 21 located on the inserted side Fw is pressed onto the engaging protruding part 30b and the bridging piece 30 is elastically deformed. At this time, the front end part 31c of the support part 31a that contacts the bridging piece 30 at a place closer to the inserting side Bw that a position where the engaging protruding part 30b is formed restricts downward inclination of the bridging piece 30 toward the inserting side Bw. Thereby, the resisting force against movement of the piece part 20 from the insertion terminating position to the pre-insertion position, that is, the so-called pulling force is increased (FIG. 6).

Figure 11:
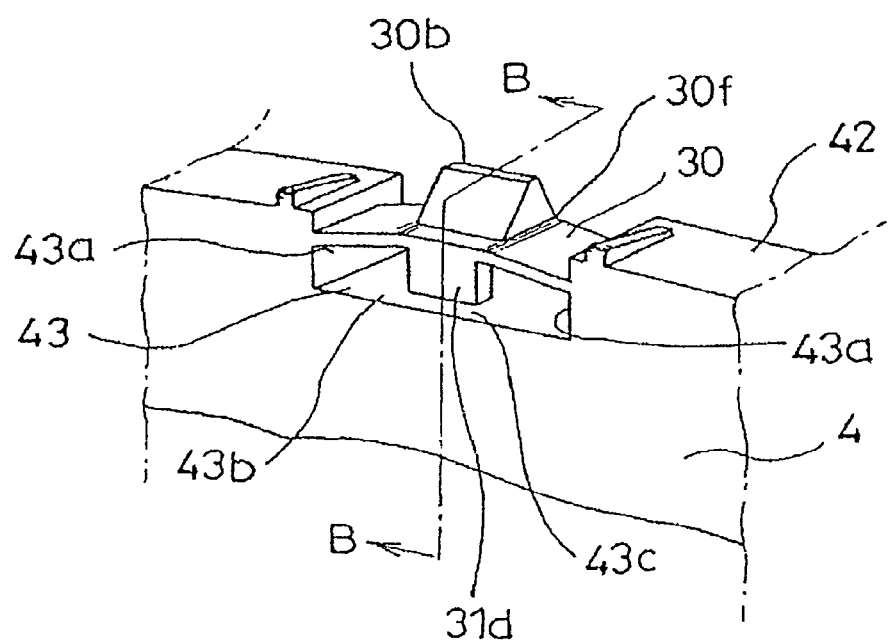
FIG. 11 is a perspective view showing another partially modified example of the attachment structure shown in FIG. 1 to FIG. 7.
Figure 12:
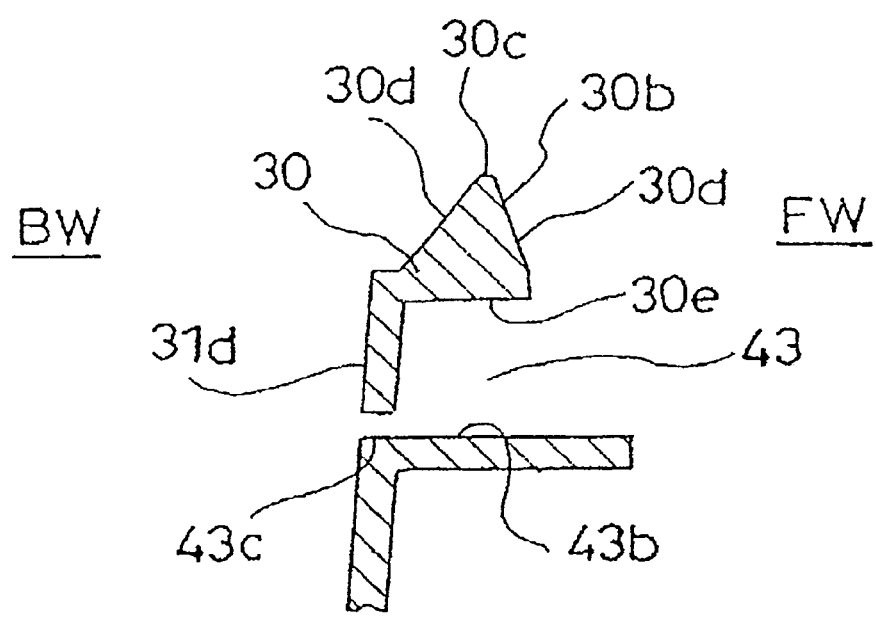
FIG. 12 is a cross-sectional view taken along a line B-B in FIG. 11.

In an example shown in FIG. 11 and FIG. 12, the restricting part 31 constitutes a contact part 31d formed in the bridging piece 30 contacting with a support surface 43c below the bridging piece 30. In the example shown in FIG. 11 and FIG. 12, the contact part 31d is configured so as to be shaped like a rib that protrudes downward from an edge of the central part 30f of the bridging piece 30 on the inserting side Bw and extends along the edge. A gap is formed between a lower end of the contact part 31d and the groove bottom 43b of the divided groove 43. In the example shown in FIG. 11 and FIG. 12, at insertion of the piece part 20, the lower end of the contact part 31d contacts the support surface 43c as a portion of the groove bottom 43b of the divided groove 43 and using the restricting part 31 as a fulcrum, the bridging piece 30 is inclined to position the engaging protruding part 30b toward the obliquely downward side. Thereby, in inserting the piece part 20 toward the insertion terminating position, the resisting force, that is, the so-called inserting force is reduced. On the other hand, when the force in the reverse direction to the direction at insertion acts on the portion of the attaching member 2, that is, the piece part 20 located at the insertion terminating position, the hole edge portion of the engaging hole 21 located on the inserted side Fw is pressed onto the engaging protruding part 30b and the bridging piece 30 is elastically deformed. At this time, at a place closer to the inserting side Bw that the position where the engaging protruding part 30b, the contact part 31d restricts downward inclination of the bridging piece 30 toward the inserting side Bw. Thereby, the resisting force against movement of the piece part 20 from the insertion terminating position to the pre-insertion position, that is, the so-called pulling force is increased.

Entire contents of all of description, claims, figures and abstract of Japanese Patent Application No. 2009-237203 filed on Oct. 14, 2009 are cited herein and are cooperated hereinto as disclosure of description of the present invention.

What is claimed is:

1. An attachment structure comprising:
an attachment tool configured to attach to an attaching member having an engaging hole formed in a piece part thereof, the attachment tool including:
a groove,
an elastically deformable bridging piece having a band plate portion bridging over the groove between two ends thereof and
an engaging protruding part, the engaging protruding part being:
arranged on the band plate portion at a front side relative to an inserting direction in which the attaching member is moved into engagement with the attachment tool, and
protruding upwardly from an upper surface of the band plate portion between the two ends, and
a restricting part, the restricting part being:
arranged under the bridging piece at a rear side relative to the inserting direction, and
protruding upwardly from a bottom surface of the groove to restrict elastic deformation of the bridging piece,
the inserting direction intersecting a longitudinal direction of the bridging piece extending between the two ends, wherein:
when the attaching member is moved in the inserting direction towards the attachment tool, the piece part deflects the front side of the bridging piece downwardly so that the engaging protruding part slides under the piece part and into the engaging hole; and
when a force in a reverse direction to the inserting direction acts on the attaching member, the piece part deflects the rear side of the bridging piece downwardly into the restricting part to thereby prevent the engaging protruding part from disengaging from the engaging hole.

2. An attachment structure according to claim 1, wherein the engaging protruding part has an apex located closer to the front side relative to the inserting direction than a midpoint in a width direction of the bridging piece, and
the restricting part is located closer to the rear side relative to the inserting direction than the apex of the engaging protruding part.

3. An attachment structure according to claim 1, wherein the restricting part is a support part formed below the bridging piece.

4. An attachment structure according to claim 1, wherein the two ends of the band plate portion are connected to sidewalls of the groove and integrally formed to the attachment tool, and
each of the sidewalls of the groove and the restricting part has a space therebetween.

5. An attachment structure according to claim 4, wherein the bridging piece is formed at an upper portion of the attachment tool, and
the engaging protruding part is formed at a midpoint of the bridging piece of the attachment tool in the longitudinal direction of the bridging piece.

6. An attachment structure according to claim 5, wherein the bridging piece includes bending parts bent toward the bottom surface of the groove between one end and the midpoint of the bridging piece and between the other end and the midpoint of the bridging piece.

7. An attachment structure according to claim 5, wherein the restricting part is a support part formed on the bottom surface of the groove below the midpoint of the bridging piece in the longitudinal direction of the bridging piece, and the support part and the bridging piece having a gap therebetween.

8. An attachment structure according to claim 1, wherein the engaging protruding part includes an apex and side surface portions extending from the upper surface of the band plate portion toward the apex, and
the side surface extending from the apex toward the rear side relative to the inserting direction, has an angle of inclination gentler than the side surface toward the front side relative to the inserting direction.

9. An attachment structure according to claim 8, wherein the restricting part includes a bottom part and a front end part integrally formed with the bottom part and protruding upwardly from the bottom part, and the front end part has a length in a longitudinal direction of the band plate portion shorter than that of the bottom part; and an upper surface of the front end part is spaced from an rear surface of the band plate portion.

10. An attachment structure according to claim 9, wherein the engaging protruding part is arranged on a middle portion of the band plate portion in the longitudinal direction thereof, and the band plate portion at the middle portion has a width in a direction perpendicular to the longitudinal direction thereof wider than those of side portions.

11. An attachment structure according to claim 10, wherein each of the side portions of the band plate portion is inclined upwardly in a direction toward the middle portion from each of the two ends thereof.

12. An attachment structure according to claim 1, wherein the attachment tool is one member integrally formed with the band plate portion, the engaging protruding part, and the restricting part.

13. An attachment unit, comprising:
an attached member,
an attachment structure attached to the attached member, and including an attachment tool configured to attach to an attaching member having an engaging hole formed in a piece part thereof, the attachment tool having
a groove,
an elastically deformable bridging piece having a band plate portion bridging over the groove between two ends thereof and
an engaging protruding part, the engaging protruding part being:
arranged on the band plate portion at a front side relative to an inserting direction in which the attaching member is moved into engagement with the attachment tool, and
protruding upwardly from an upper surface of the band plate portion between the two ends, and
a restricting part, the restricting part being:
arranged under the bridging piece at a rear side relative to the inserting direction, and
protruding upwardly from a bottom surface of the groove to restrict elastic deformation of the bridging piece,
the inserting direction intersecting a longitudinal direction of the bridging piece extending between the two ends, and
a receiving gap for a part of the attaching member formed between the attached member and the bridging piece, wherein
when the attaching member is moved in the inserting direction towards the attachment tool, the piece part deflects the front side of the bridging piece downwardly so that the engaging protruding part slides under the piece part and into the engaging hole, and when a force in a reverse direction to the inserting direction acts on the attaching member, the piece part deflects the rear side of the bridging piece downwardly into the restricting part to thereby prevent the engaging protruding part from disengaging from the engaging hole.

14. An attachment unit, comprising:

an attached member, and an attachment structure attached to the attached member, and including an attachment tool configured to attach to an attaching member having an engaging hole formed in a piece part thereof, the attachment tool having a groove, an elastically deformable bridging piece having a band plate portion bridging over the groove between two ends thereof and an engaging protruding part, the engaging protruding part being:

arranged on the band plate portion at a front side relative to an inserting direction in which the attaching member is moved into engagement with the attachment tool, and protruding upwardly from an upper surface of the band plate portion between the two ends, and a restricting part, the restricting part being:

arranged under the bridging piece at a rear side relative to the inserting direction, and protruding upwardly from a bottom surface of the groove to restrict elastic deformation of the bridging piece, the inserting direction intersecting a longitudinal direction of the bridging piece extending between the two ends, wherein the attached member includes a wall part forming a receiving gap for a portion of the attaching member between the wall part and the bridging piece, and wherein when the attaching member is moved in the inserting direction towards the attachment tool, the piece part deflects the front side of the bridging piece downwardly so that the engaging protruding part slides under the piece part and into the engaging hole, and when a force in a reverse direction to the inserting direction acts on the attaching member, the piece part deflects the rear side of the bridging piece downwardly into the restricting part to thereby prevent the engaging protruding part from disengaging from the engaging hole.

* * * * *